(12) United States Patent
Ballard

(10) Patent No.: US 7,299,503 B2
(45) Date of Patent: Nov. 20, 2007

(54) APPARATUS AND METHOD FOR LOCATION SPECIFIC AUTHENTICATION USING POWERLINE NETWORKING

(75) Inventor: Thomas Vance Ballard, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 881 days.

(21) Appl. No.: 10/607,556

(22) Filed: Jun. 26, 2003

(65) Prior Publication Data
US 2005/0005150 A1    Jan. 6, 2005

(51) Int. Cl.
*G06F 21/00* (2006.01)
(52) U.S. Cl. ...................................................... 726/29
(58) Field of Classification Search .................. 726/29, 726/27
See application file for complete search history.

(56) References Cited

U.S. PATENT DOCUMENTS

| | | | |
|---|---|---|---|
| 3,925,763 A | 12/1975 | Wadhwani et al. | 340/164 R |
| 4,755,792 A | 7/1988 | Pezzolo et al. | 340/538 |
| 4,999,607 A | 3/1991 | Evans | 340/533 |
| 5,554,968 A | 9/1996 | Lee | 340/310.01 |
| 5,559,520 A * | 9/1996 | Barzegar et al. | 342/357.1 |
| 6,243,571 B1 | 6/2001 | Bullock et al. | 455/402 |
| 6,249,223 B1 | 6/2001 | Christensen | 340/540 |
| 6,615,348 B1 * | 9/2003 | Gibbs | 713/162 |
| 6,832,321 B1 * | 12/2004 | Barrett | 726/11 |
| 2002/0177449 A1 * | 11/2002 | McDonnell et al. | 455/456 |
| 2003/0187984 A1 * | 10/2003 | Banavar et al. | 709/225 |
| 2003/0233418 A1 * | 12/2003 | Goldman | 709/206 |
| 2004/0003079 A1 * | 1/2004 | Aiu et al. | 709/225 |

OTHER PUBLICATIONS

Cogency White Paper, "Data Communications over Power Lines", Copyright 2001, Cogency Semiconductor Inc., pp. 1-6.
Cogency White Paper, "Home Networking over Power Lines", Copyright 2002, Cogency Semiconductor Inc., pp. 1-8.

* cited by examiner

*Primary Examiner*—Kambiz Zand
*Assistant Examiner*—Andrew L Nalven
(74) *Attorney, Agent, or Firm*—Duke W. Yee; Jeffrey S. LaBaw; Gerald H. Glanzman

(57) ABSTRACT

A mechanism for ensuring the physical location of data processing devices as a security check is provided. With this mechanism, security data is transmitted to data processing devices via an electrical network and is used to perform a security check to determine if the data processing device may operate. The data processing devices may be limited such that they may only power-up, boot-up, or remain operational when they are coupled to the electrical network. Thus, they must be physically located such that they may gain access to the electrical network. In addition, a security check may be used to control which data processing devices may communicate data packets with one another over the data network. When a data packet is received by a data processing device, security data in the data packet is compared against a local history of security data received by the recipient of the data packet via the electrical network. If matching security data is found in the history for the same time represented by an associated timestamp, then the sending data processing device and the receiving data processing device are determined to be present on the same electrical network and may communicate with one another.

3 Claims, 5 Drawing Sheets

APPARATUS AND METHOD FOR LOCATION SPECIFIC AUTHENTICATION USING POWERLINE NETWORKING

BACKGROUND OF THE INVENTION

1. Technical Field

The present invention is directed to an improved authentication mechanism for data processing devices. More specifically, the present invention is directed to an apparatus and method for location specific authentication of data processing devices using powerline networking.

2. Description of Related Art

Physical location is one of the harder aspects of computer security to ensure and verify. It is often quite desirable to restrict access to a data network to computing devices that are physically situated within the confines of a particular company, government agency, or other entity's physical location. For example, a company, government agency, or the like may wish to allow users to access a data network only when they are using a computer that is present within the building in which the company, government agency, or the like operates. This may ensure that the users of such computing devices are authorized employees of the company, agency or the like through the use of other security measures present in the building, e.g., ID cards, security guards, passcodes, and the like.

There currently is no adequate security mechanism for ensuring and verifying the physical location of computing devices. The known security mechanism for controlling access to data networks, or even access to computing devices themselves, are based on password, user identifiers, digital certificates, digital signatures, and the like. These mechanisms cannot by themselves be used to verify the physical location of computing devices.

Recently, the ability to transmit data over powerlines has been developed as a possible networking alternative. For example, U.S. Pat. No. 5,554,968 to Lee, entitled "Data Communication Using Power Lines," issued Sep. 10, 1996, describes a mechanism in which message signals may be superimposed on an AC power signal. The message signals include a header that identifies the sending device and the intended recipient device. In this way, only the intended receiving network is able to trap the message signal.

In addition, a Canadian company by the name of Cogency has developed a system in which powerline integrated circuits make use of existing in-home AC electrical wires for transmitting digital data at high speeds. The Cogency approach to providing data communication over AC electrical wires is described, for example, in the white papers "Data Communications over Power Lines" and "Home Networking Over Power Lines," available from www.cogency.com.

Even though data transmissions over electrical power lines is generally known, there are no current mechanisms for using these data transmissions over electrical wires as a means for ensuring the physical location of computing devices. In other words, there are no known mechanisms for controlling access to data networks and computing devices based on the data that is transmitted over electrical power lines.

Thus, it would be beneficial to have an apparatus and method for using the site specific nature of an electrical network as a means for ensuring physical location of data processing devices. Moreover, it would be beneficial to have an apparatus and method that uses security data transmitted over electrical powerlines as a means for determining whether data processing devices may operate or continue to operate as part of a data network.

SUMMARY OF THE INVENTION

The present invention provides a mechanism for ensuring the physical location of data processing devices as a security check. With the mechanism of the present invention, security data is transmitted to data processing devices via an electrical network. The security information is provided to the data processing devices via a data network such that the data processing devices may utilized this security information in authenticating the data processing devices using the security data received via the electrical network. The data processing devices may be limited such that they may only power-up, boot-up, or remain operational when they are coupled to the electrical network. Thus, they must be physically located such that they may gain access to the electrical network. For example, they must be present within the building in which the electrical network is situated.

In addition, the security check of the present invention may be used to control which data processing devices may communicate data packets with one another of the data network. For example, a data packet may include security data and a timestamp, the security data being data obtained via an electrical network. When the data packet is received by another data processing device, the security data is compared against a local history of security data received by the recipient of the data packet via the electrical network. If matching security data is found in the history for the same time represented by the timestamp, then the sending data processing device and the receiving data processing device are determined to be present on the same electrical network and may communicate with one another.

Thus, with the present invention, theft of equipment from a site or location is deterred since the equipment will not be allowed to operate when not in the presence of the data signal that is transmitted over the electrical network of the site or location. In addition, the present invention deters outside data processing devices from sending data packets to data processing devices associated with a site or location since those data packets will not be processed because the sending data processing device does not have access to the data signal being sent over the electrical network of the site or location.

These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENTS

Figure 1:
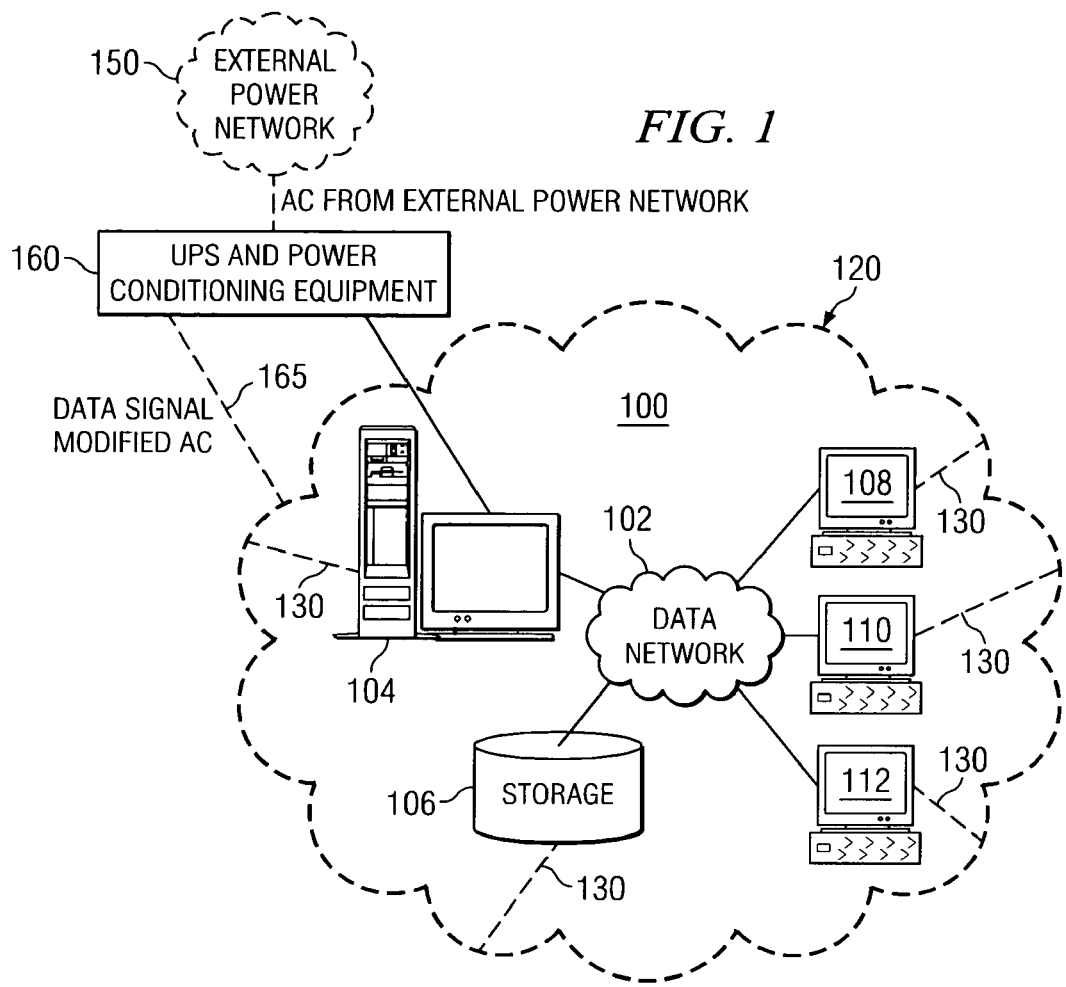
FIG. 1 is an exemplary diagram of a network of data processing devices coupled to an electrical network in which the present invention may be implemented.

With reference now to the figures, FIG. 1 is an exemplary diagram of a network of data processing devices coupled to an electrical network in which the present invention may be implemented. The system of the present invention, as illustrated in FIG. 1, is a combination of a site-specific data network and electrical network (the combination of the data network and the electrical network is referred collectively herein as a "site-specific network"). The site-specific data network may be coupled to other networks, such as other wide area networks, local area networks, the Internet, or the like, via known server mechanisms. The site-specific electrical network is coupled to an external power network, such as a power grid, via known electrical connections.

The present invention provides an improvement to the supply of power over the site-specific power network, and an improvement to the authentication of data processing devices on the data network, by providing for data transmission over the site-specific power network as a mechanism for ensuring network access to site-located data processing devices. In order to explain the operation of the present invention, it is first necessary to provide a brief explanation of the data network of the present invention followed by an explanation of how the data network and the electrical network work together to achieve the objectives of the present invention.

As illustrated in FIG. 1, the present invention includes a network of data processing devices/systems. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other data processing devices not shown.

In the depicted example, network data processing system 100 is a local area network with network 102 being a site-specific collection of networks and gateways that use a suite of protocols to communicate with one another. Of course, network data processing system 100 also may be implemented as a number of different types of networks, such as for example, the Internet, an intranet, a wide area network (WAN), or the like. FIG. 1 is intended as an example, and not as an architectural limitation for the present invention.

By "site-specific," what is meant is that the collection of data processing devices, networks, and gateways, are all associated with the same location. This location may be, for example, a geographical location, a place of business, a particular physical building or man-made structure, a hierarchical division of an organization, such as a department within a company or government agency, or the like.

Thus, for example, a single company or government agency, may have a plurality of departments all located within the same physical building. The data processing devices of all of the departments, their network connections, and the like, as a whole may be considered a single site-specific network. Alternatively, each individual department may have their own subgroup of data processing devices, network connections, and the like, that define their own individual site-specific network.

The "site-specific" nature of the group of data processing devices, network connections, and the like, is defined by the electrical connections between these devices. That is, data processing devices coupled to the same electrical network may be defined to be part of the same "site-specific" network even though they may communicate with other data processing devices on the same electrical network over a distributed data network that is not limited in location.

Additionally the "site-specific" network can also span multiple physical locations if the individual locations have a means of injecting the same data signal into the AC electrical signal received from an outside source. For example, if the electrical networks of two distinct locations are constructed to provide identical security information over the electrical connections, then the two physical sites constitute one single "site-specific" network within the meaning of the term as it is used in the present description.

As illustrated in FIG. 1, the server 104, storage device 106, clients 108-112, and the like, are all coupled to an electrical network 120 via electrical power connections 130. For example, the data processing devices 104, 106, and 108-112 may be coupled to the electrical network by way of electrical plugs and wall mounted outlets in a physical building or man-made structure. The electrical network 120 receives power from an external power network 150, e.g., a power grid, uninterruptible power supply (UPS) and power conditioning equipment 160.

The power supplied by the external network 150 is an alternating current (AC) power signal that is received by the UPS and power conditioning equipment 160. The UPS and power conditioning equipment 160 performs functions in accordance with the present invention to use the AC electrical power signal as a carrier wave for data communication over the electrical network 120. In order to modulate data onto the AC electrical power signal, the UPS and power conditioning equipment 160 may make use of the Homeplug™ powerline technology available from Cogency. The Homeplug™ powerline technology is described, for example, in "Data Communications over Power Lines" and "Home Networking over Power Lines," both white papers available from Cogency at www.cogency.com, and hereby incorporated by reference.

The data modulated onto the AC electrical power signal carrier wave is a site-specific data signal that is introduced into the AC electrical power signal after it is received from the external power network 150 but prior to the AC power signal being provided to the wall mounted outlets to which the data processing devices are plugged in. Thus, only the data processing devices that are coupled to the electrical network 120 are capable of receiving the modified AC power signal having the data signal modulated thereon.

The particular data signal that is generated and added to the AC power signal may be generated based on security information received from, for example, a server 104 of the site-specific network. Alternativley, the UPS and power conditioning equipment 160 may be provided with the necessary hardware/software to determine the appropriate security information upon which the data signal is generated. In either case, the security information must be available to both the UPS and power conditioning equipment 160 and the data processing devices 104, 106, 108, 110 and 112 of the site-specific network.

This security information may include, for example, a digital signature, a digital certificate, public key/private key encryption information, a randomly generated string of alphanumeric characters, or other security mechanism generally known in the art. The server 104 or UPS and power conditioning equipment 160 may generate this security information on a periodic or continual basis. This security information is provided to both the UPS and power conditioning equipment 160 and the data processing devices of the site-specific network.

The data processing devices may operate in a number of security modes based on the data received via the electrical network 120. In a first mode, the data processing devices perform a security check against the data received via the electrical network 120 to determine if the data processing device is permitted to power-up or boot. In this mode of operation, data processing devices are not permitted to power-up or boot if they are not in the presence of the appropriate AC power signal having the correct security information data. In this way, theft of equipment from a site or location may be deterred since the equipment will not power-up or boot unless the equipment is physically located such that it may receive power from the electrical network 120.

This check may further be performed on a periodic basis in order to allow continued use of the equipment. In this way, a user may not power-up or boot the data processing device and then transport it to another location to continue use of the data processing device.

In a second mode, the data processing devices perform a security check based on the data received over the electrical network 120 to determine if data packets received from a computing device are from another device on the same electrical network 120, i.e. at the same site or same location. In such a mode of operation, the security information data that is present in the electrical power signals on the electrical network 120 may be continuously modified based on a non-predictable stream of data, such as a rolling random number, a keyed hash function, or the like. The data processing devices may maintain a history over a predetermined period of time of the security information that has been received over the electrical network.

When a first data processing device wishes to send data to a second data processing device, the first data processing device may add an encrypted version of the security information data and a time stamp for when this security information data was received that was last received to the data packets being sent (encryption of this security information data is preferred, but is optional and is not necessary to the operation of the present invention). The second data processing device may decrypt this security information data and compare it to its own history to determine if there is a matching entry for the indicated time stamp. If there is a matching entry, then the two data processing devices must be on the same electrical network 120 and thus, must be present at the same site or location. As a result, the second data processing device may then be permitted to process data packets sent from the first data processing device.

The histories maintained by the data processing devices may be limited in length such that only a short amount of time may be represented in the histories. For example, the history length may be limited to an average period of time in which it takes for a first data processing device to transmit a data packet to another data processing device. In this way, a person may not remove the data processing device from the electrical network 120 and later use old security information data and timestamps to communicate with data processing devices still attached to the electrical network 120.

In a third mode of operation, the data processing devices operate in a combination approach using both the first and section modes of operation. That is, first security information data may be added to the AC electrical signal being sent over the electrical network 120 for use in determining whether a data processing device is able to continue a power-up or boot process. Second security information data, such as a continuously changing security information data stream, may be added to the AC electrical signal for use in determining if two or more data processing devices may transmit and process data packets to and from each other.

Thus, the present invention provides security mechanisms for ensuring and verifying the physical location of data processing devices by way of electrical networks. With the present invention, theft of equipment and the use of equipment from an outside location to attempt to infiltrate a site-specific network is deterred and reduced.

Figure 2:
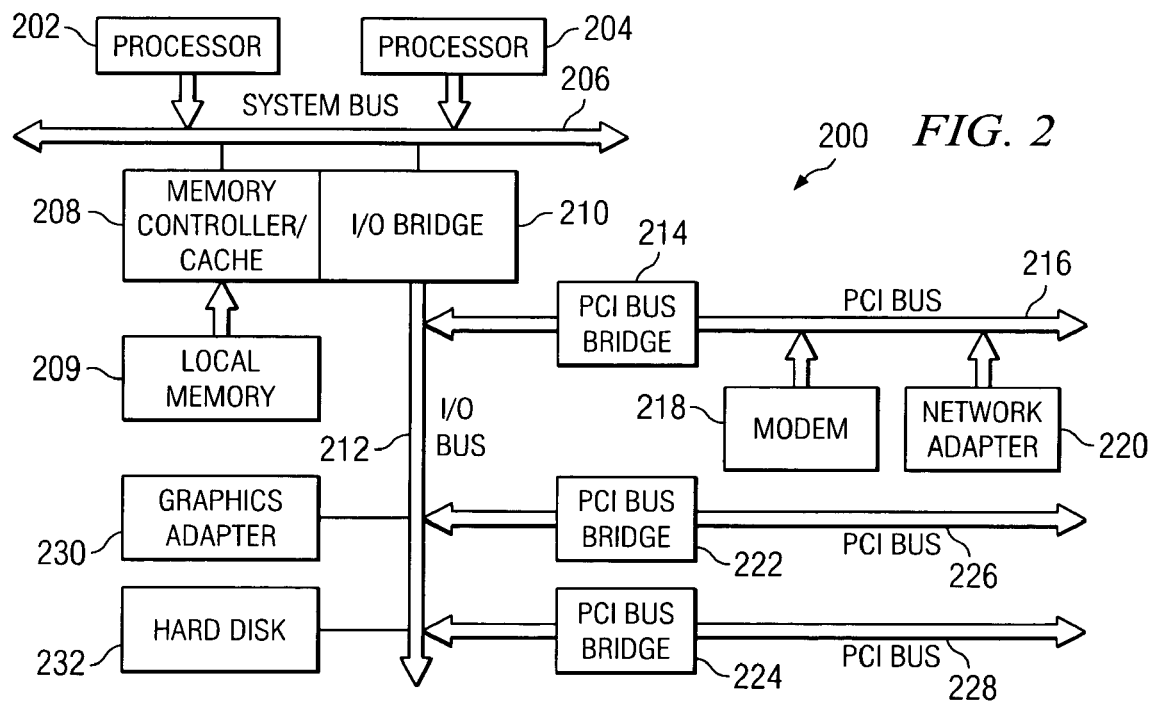
FIG. 2 is an exemplary diagram of a server computing device in which the present invention may be implemented.

As mentioned above, the security information that is used to generate the data or data stream that is modulated onto the electrical signal sent over the electrical network 120 may be provided by a server, such as server 104. The server 104 may include a security module, such as security software, for implementing security procedures, generating and managing security information, and the like. Such security software is generally known in the art but has not been applied to a mechanism for ensuring and verifying the physical location of data processing devices in the manner of the present invention. FIG. 2 is an exemplary diagram of a server computing device in which such security mechanisms may be implemented.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, may also be used in addition to or in place of the hardware depicted. The depicted example is not meant to imply architectural limitations with respect to the present invention. The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

The server apparatus illustrated in FIG. 2 may be provided with security software used to generate security information that is used as a basis for generating data or a data stream that is added to an electrical signal on the electrical network 120. This security information may further be provided to the data processing devices via the data network 102 so that they may use it for verification and authentication purposes.

Since the data processing devices receive data from the server 104, they are clients of the server 104. These client devices may take many forms including workstations, personal computers, peripheral devices such as printers, scanners, and the like, portable computing devices, etc. An example of a client device that may be a personal computer or workstation is provided in FIG. 3.

Figure 3:
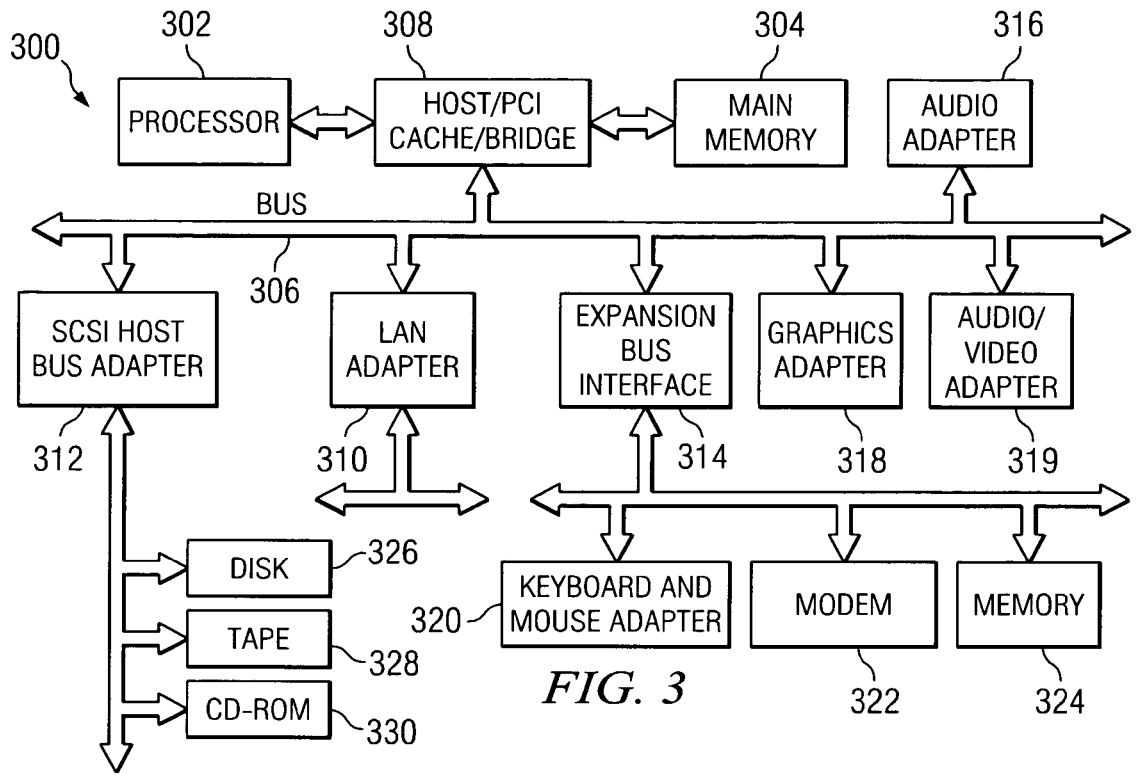
FIG. 3 is an exemplary diagram of a client computing device in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide nonvolatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The client device illustrated in FIG. 3 may be equipped with hardware/software for performing verification and authentication functions based on data received over the electrical network 120 in accordance with the present invention. For example, many motherboards have a basic-input-output-system (BIOS) which provides for multiple levels of password access. The present invention may provide a modified BIOS in which the digital signature, certificate, or the like, generated by the security mechanisms of the server 104, or UPS and power conditioning equipment 160, may be configured into the BIOS such that the client device cannot boot without being in the presence of the electrical signal from the electrical network 120.

Alternatively, or in addition to the modified BIOS discussed above, the present invention may provide a software and/or hardware mechanism for performing authentication and verification of the operation of the client device based on security information provided to it by the server 104, UPS and power conditioning equipment 160, and security information data received via the electrical network 120. This software/hardware may serve to extract the security information from the security information data received via the electrical network 120, compare it against security information received from the server 104, or security information maintained in a history as discussed previously, and authorize or deny the operation of the client device based on the comparison.

As mentioned previously, the UPS and power conditioning equipment of a site receives or generates security information data that is added to an electrical signal received from an external power network or grid. This modified electrical signal is transmitted through an electrical network of a particular site and is received by data processing devices coupled to the electrical network, e.g., via wall mounted electrical outlets. The data processing devices extract the data from the modified electrical signal and perform authentication and verification operations based on this received data.

Figure 4:
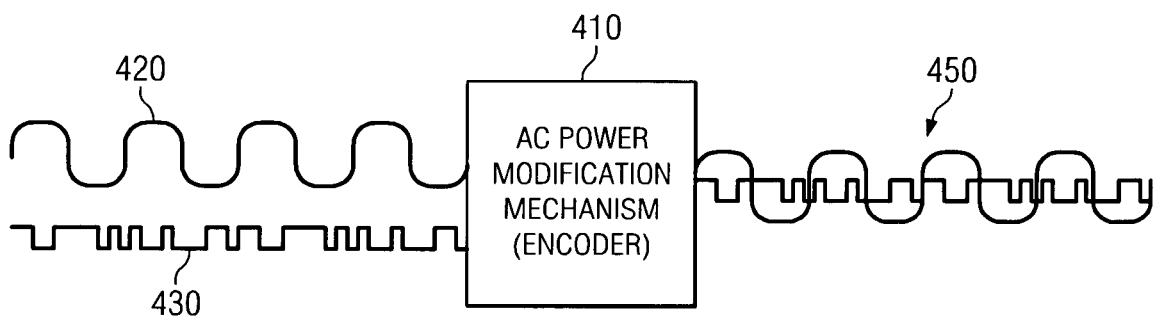
FIG. 4 is an exemplary diagram illustrating the inputs and output of an AC power modification mechanism according to one exemplary embodiment of the present invention.

FIG. 4 is an exemplary diagram illustrating the inputs and output of an AC power modification mechanism according to one exemplary embodiment of the present invention. As shown in FIG. 4, the AC power modification mechanism 410 receives as inputs an AC electrical signal 420 and a data signal 430. The data signal 430 may be generated based on security information obtained from a server or generated by the UPS and power conditioning equipment, for example. Moreover, the data signal 430 may be a constant signal, such as a non-changing data value, a periodically changing signal, such as a data value that changes after the elapse of a predetermined time period, or may be a continuously changing data signal, such as in the case of a data stream.

The AC power modification mechanism 410 acts as an encoder in that it encodes the AC electrical signal 420 received from an external electrical network, such as a power grid, with the data signal 430. The result is a modified AC electrical signal 450 that is a combination of the AC electrical signal 420 and the data signal 430. The modified AC electrical signal 450 is output to an electrical network that is part of a site-specific network.

The AC power modification mechanism 410 is provided within the site specific network such that only data processing devices coupled to the electrical network of the particular site are capable of receiving the modified AC electrical signals 450 output by the AC power modification mechanism 410. These data processing devices receive the modified AC electrical signals 450, convert them into DC signals, and in the process extract the data signal 430.

Figure 5:
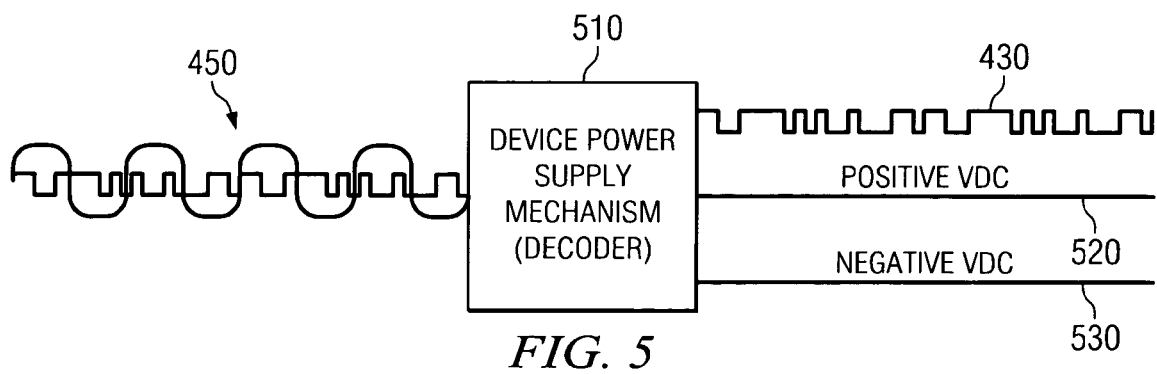
FIG. 5 is an exemplary diagram illustrating the input and outputs of a device power supply mechanism according to one exemplary embodiment of the present invention.

FIG. 5 is an exemplary diagram illustrating the input and outputs of a device power supply mechanism according to one exemplary embodiment of the present invention. As shown in FIG. 5, the modified AC electrical signal 450 is received by the device power supply mechanism 510. The device power supply mechanism 510 acts as a decoder on the modified AC electrical signal 450 and an AC to DC converter. The modified AC electrical signal is converted into positive and negative voltage DC signals 520 and 530.

During this AC to DC conversion, the data signal 430 is extracted as noise in the modified AC electrical signal 450. Rather than discarding this noise, however, the present invention interprets this noise as a data signal 430. The data signal 430 is then provided to the client device for use in performing the authentication and verification operations of the present invention, as discussed previously.

Figure 6:
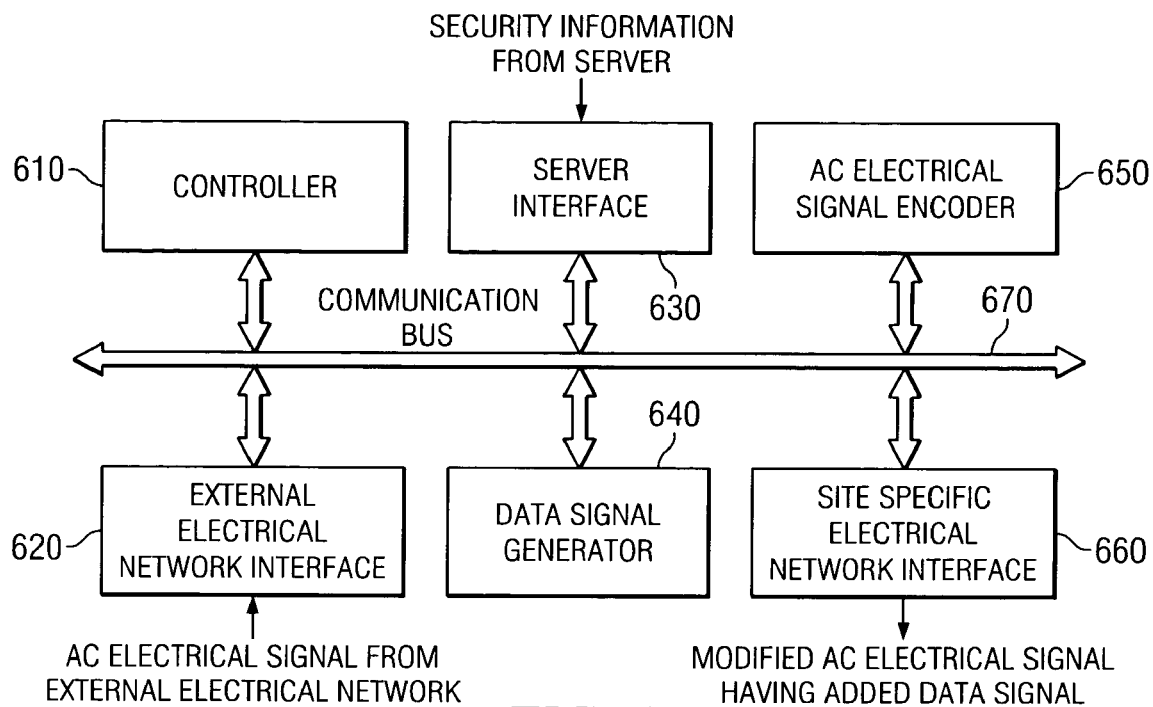
FIG. 6 is an exemplary block diagram illustrating the primary operational components of an AC power modification mechanism of one exemplary embodiment of the present invention.

FIG. 6 is an exemplary block diagram illustrating the primary operational components of an AC power modification mechanism of one exemplary embodiment of the present invention. The elements of FIG. 6 may be implemented in hardware, software, or any combination of hardware and software. In a preferred embodiment, the elements of FIG. 6 include hardware elements for receiving and transmitting an AC electrical signal and include software/hardware elements for generating a data signal and encoding the AC power signal with the data signal.

As shown in FIG. 6, the AC power modification mechanism includes a controller 610, an external power network interface 620, a server interface 630, a data signal generator 640, an AC power signal encoder 650, and a site specific electrical network interface 660. The elements 610-660 are in communication with one another via the communication bus 670. Although a bus architecture is illustrated, the present invention is not limited to such and any architecture that facilitates the communication of control/data signals between the elements 610-660 may be used without departing from the spirit and scope of the present invention.

The controller 610 controls the overall operation of the AC power modification mechanism and orchestrates the operation of the other elements 620-660. The external power network interface 620 receives AC electrical signals from an external electrical network, e.g., a power grid, which is used to provide a modified AC electrical signal to an electrical network of a site-specific network.

The server interface 630 is used to receive security information from a server associated with a data network of the site-specific network. The AC power modification mechanism uses this security information to generate a data signal via the data signal generator 640. This data signal may be representative, for example, of an encrypted password, digital signature, digital certificate, public key, or other known security mechanism.

The data signal generated by the data signal generator 640 is encoded onto the AC electrical signal received via the external power network interface 620 by the AC electrical signal encoder 650. The encoding may be performed, for example, by modulating the data signal onto the AC electrical signal such that a modified AC electrical signal is generated. The modified AC electrical signal is of a form in which the AC electrical signal is substantially as received from the external power network but with the data signal being represented as "noise" in the AC electrical signal. The modified AC electrical signal is output to an electrical network of a site specific network via the site specific electrical network interface 660.

Figure 7:
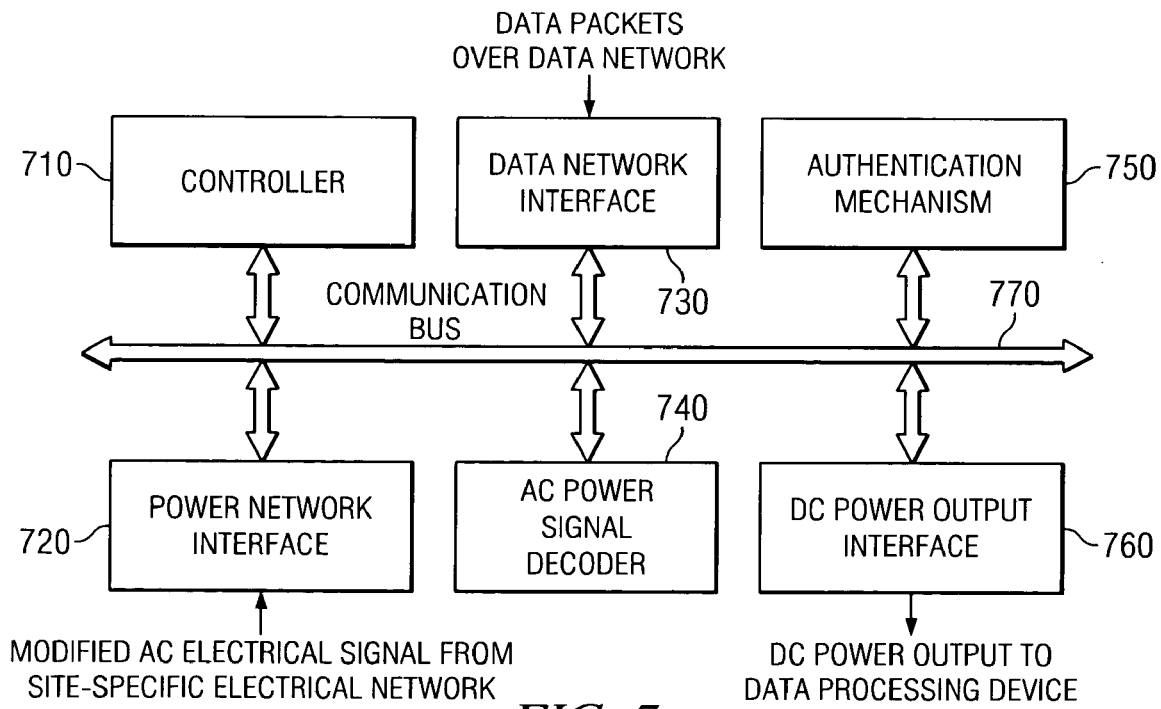
FIG. 7 is an exemplary block diagram illustrating the primary operational components of a device power supply mechanism in accordance with one exemplary embodiment of the present invention.

FIG. 7 is an exemplary block diagram illustrating the primary operational components of a device power supply mechanism in accordance with one exemplary embodiment of the present invention. The device power supply mechanism of FIG. 7 may be associated with any type of data processing system that is coupled to an electrical network. The device power supply mechanism may be implemented as an internal device to the data processing device or as a separate device that is placed in the line between the power line of the data processing device and the electrical network. For example, the device power supply mechanism of FIG. 7 may be implemented as a device that may be inserted into the plug opening of a wall mounted outlet and which has a power and data connection to the data processing device or data network.

The elements in FIG. 7 may be implemented in hardware, software, or any combination of hardware and software. In a preferred embodiment, the some elements, such as the electrical network interface 720, AC electrical signal decoder 740 and DC power output interface 760 are implemented in hardware while the other elements are implemented as software instructions executed by one or more data processing devices. However, any implementation of the elements shown in FIG. 7 is intended to be within the spirit and scope of the present invention.

As shown in FIG. 7, the device power supply mechanism includes a controller 710, an electrical network interface 720, a data network interface 730, an AC electrical signal decoder 740, an authentication mechanism 750, and a DC power output interface 760. The elements 710-760 are in communication with one another via the communication bus 770. Although a bus architecture is shown in FIG. 7, the present invention is not limited to such and any architecture that facilitates the communication of control/data signals between the elements 710-760 may be used without departing from the spirit and scope of the present invention.

The controller 710 controls the overall operation of the device power supply mechanism and orchestrates the operation of the other elements 720-760. The electrical network interface 720 receives a modified AC electrical signal from a site-specific electrical network. The data network interface 730 is used to receive security information from a server or other device for use in performing authentication based on the data signals extracted from modified AC electrical signals.

The AC electrical signal decoder 740 receives the modified AC electrical signal via the electrical network interface 720 and converts the modified AC electrical signal into positive and negative voltage signals which are output to the data processing device via DC power output interface 760 to thereby power the data processing device. In the process of this conversion, the data signal is extracted from the modified AC electrical signal as "noise" in the signal. This data signal is provided to the authentication mechanism 750.

The authentication mechanism 750 receives the data signal from the AC electrical signal decoder 740 and authenticates the use of the data processing device based on the data signal and security information received via the data network interface 730. This authentication may take the form of the authentication mentioned above with regard to the three modes of operation.

For example, in one embodiment, the authentication mechanism 750 may be invoked in response to a boot-up or power-up condition of the data processing device. The BIOS or boot code may be modified to perform a check of the security information data being received over the electrical connection of the data processing device. This check may involve receiving the data signal over the electrical connection, decrypting the data signal, and the performing a comparison of the decrypted data with the security information stored by the authentication mechanism 750. This security information may include, for example, a private key, digital certificate, digital signature, password, or the like.

If the comparison results in a match, then the data processing device is determined to be coupled to an electrical network at the site where the data processing device is intended to be and the data processing device is allowed to continue the power-up or boot-up process. If the comparison results in a mismatch, then the data processing device is determined to be either not at the required site or to not be an authorized data processing device for the site at which it is located, and the power-up or boot-up process is not permitted to continue. In this case, the data processing device may be powered-down and/or an error condition may be indicated to a user of the data processing device.

As previously mentioned, this check may further be performed on a periodic basis in order to avoid a user powering-up or booting the data processing device at the required site and then transporting the data processing device outside of the site. That is, this check may be required to be performed every so many minutes, hours, or the like. If the check fails, then the data processing device may be immediately shutdown and/or an error condition may be indicated to the user of the data processing device.

In another embodiment of the present invention, the authentication mechanism 750 may perform authentication of data packets being received prior to the data packets being processed. In such an embodiment, each data packet has security information and a timestamp encrypted and inserted thereon that corresponds to the security information received by a sending data processing device via the electrical network at a particular time. Each data processing device on the electrical network maintains a history of security information received over the electrical network for a predetermined period of time. When a data packet is received, the encrypted security information and timestamp are extracted and decrypted and compared to the recipient data processing device's history.

If matching security information is present in the history at the time indicated by the timestamp, then the data packet may be processed by the recipient data processing device. In addition, the address of the sending data processing device may be added to an authorized data processing device list that indicates the data processing devices that have been identified as being present on the site-specific network. This list may be consulted prior to performing a check of the security information and the timestamp of the data packets in order to bypass this check for data processing devices that have already been authenticated. This list may be cleared periodically so that data processing devices that have already been authenticated will need to be re-authenticated periodically to ensure that they are still coupled to the site-specific network.

If there is no matching security information in the history at the time indicated by the timestamp, the data packet is not processed and further data packets from the sending data processing device are automatically dropped. The sending data processing device may be informed of the fact that the recipient data processing device is refusing to process the data packets and an administrator of the data network may be alerted to the possibility of an interloper being present on the data network.

The refusal to process further data packets form the sending data processing device may be performed in a similar manner as the authentication discussed above. That is, the address of the sending data processing device may be added to a blocked data processing device list and this list may be checked prior to performing the security information and timestamp check discussed above. If the address of a sending data processing device is present in this list, the data packet that it sent may be automatically dropped without having to perform the check of the security information and timestamp. As with the authorized data processing device list, this list may be periodically cleared such that data packets from sending data processing devices are again checked based on the security information and timestamp.

The data signal that is added to the AC electrical signal, in this embodiment, may be a periodically changing data signal or a constantly changing data signal, such as a data stream. The histories maintained by the data processing devices may be for a short period of time, such as the average time required to transmit and process a data packet over the data network, so as to avoid the possibility that a data processing device may make use of stale security information to gain access to the data network.

As previously mentioned, yet another embodiment of the present invention involves a combination of the two embodiments discussed above. That is, both the power-up or boot-up security check and the data packet processing checks may be performed in this alternative embodiment. In such an embodiment, it may be necessary to have two data signals added to the AC electrical signal. A first data signal representing the security information data used to perform the power-up or boot-up security check and a second data signal representing the security information data used to perform the data packet processing security check. In such a case, the "noise" that is extracted from the AC electrical signal that represents the data signals may further be split into two data signal values one representing each of the data signals.

While these three security checking mechanisms are described as being the preferred embodiments of the present invention, other types of security checks may be performed without departing from the spirit and scope of the present invention. The principle concept of the present invention being a security mechanism for assuring that data processing devices that wish to connect to a data network or communicate over a data network also be coupled to the same electrical network and thereby being able to authenticate the physical location of the data processing devices.

Thus, the present invention provides a security mechanism in which data processing devices must be coupled to a site-specific network in order to power-up or boot-up the data processing device and process data packets from other devices on the site-specific network. In this way, theft of equipment from a site or the use of unauthorized equipment within a site is deterred. Moreover, the ability for an unauthorized data processing device to send data packets to data processing devices that are part of the site-specific network and have them process those data packets is reduced.

Figure 8:
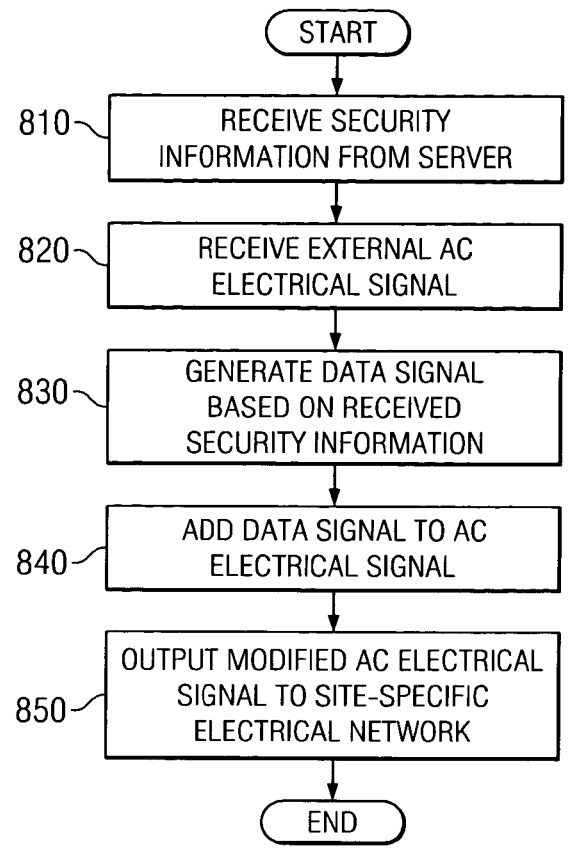
FIG. 8 is a flowchart outlining an exemplary operation of one exemplary embodiment of the present invention with regard to injecting a data signal into a received AC power signal.
Figure 9:
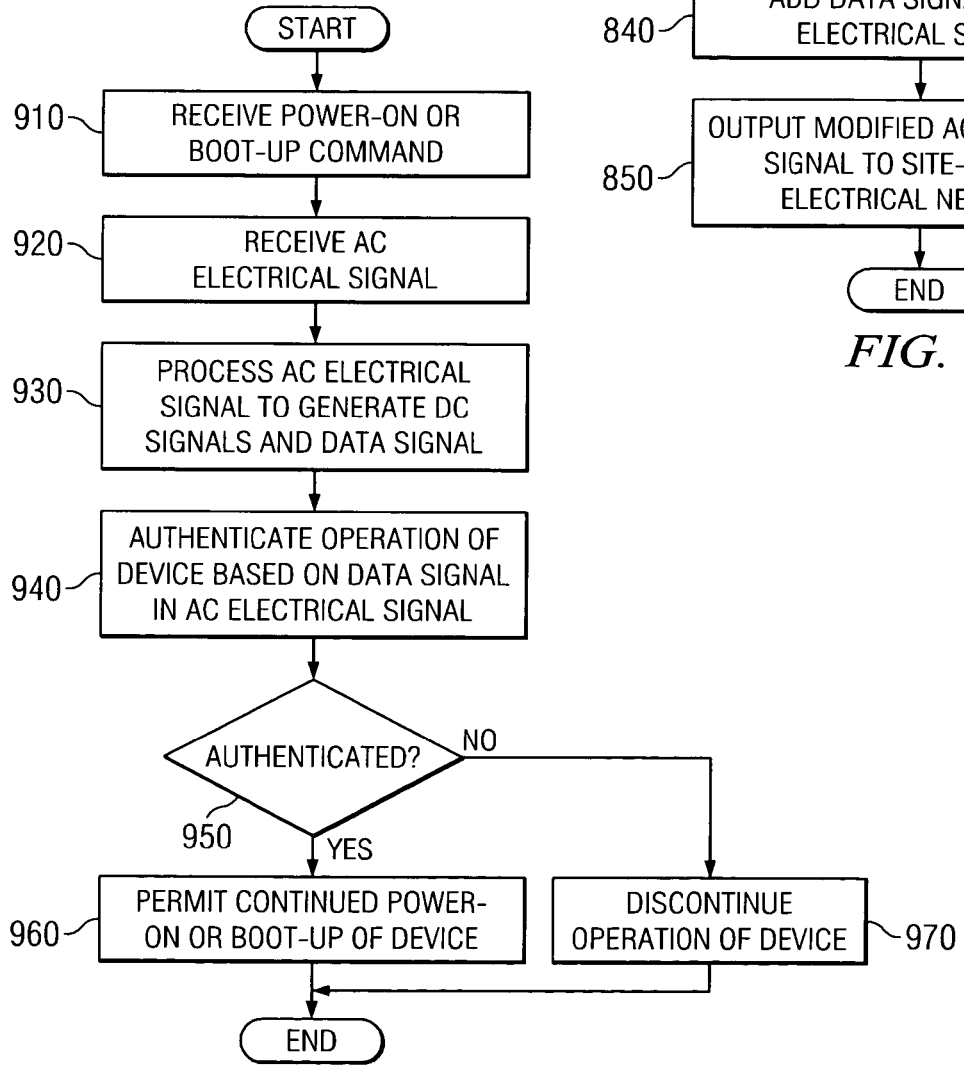
FIG. 9 is a flowchart outlining an exemplary operation of one exemplary embodiment of the present invention with regard to determining whether a data processing device is to be allowed to operate.
Figure 10:
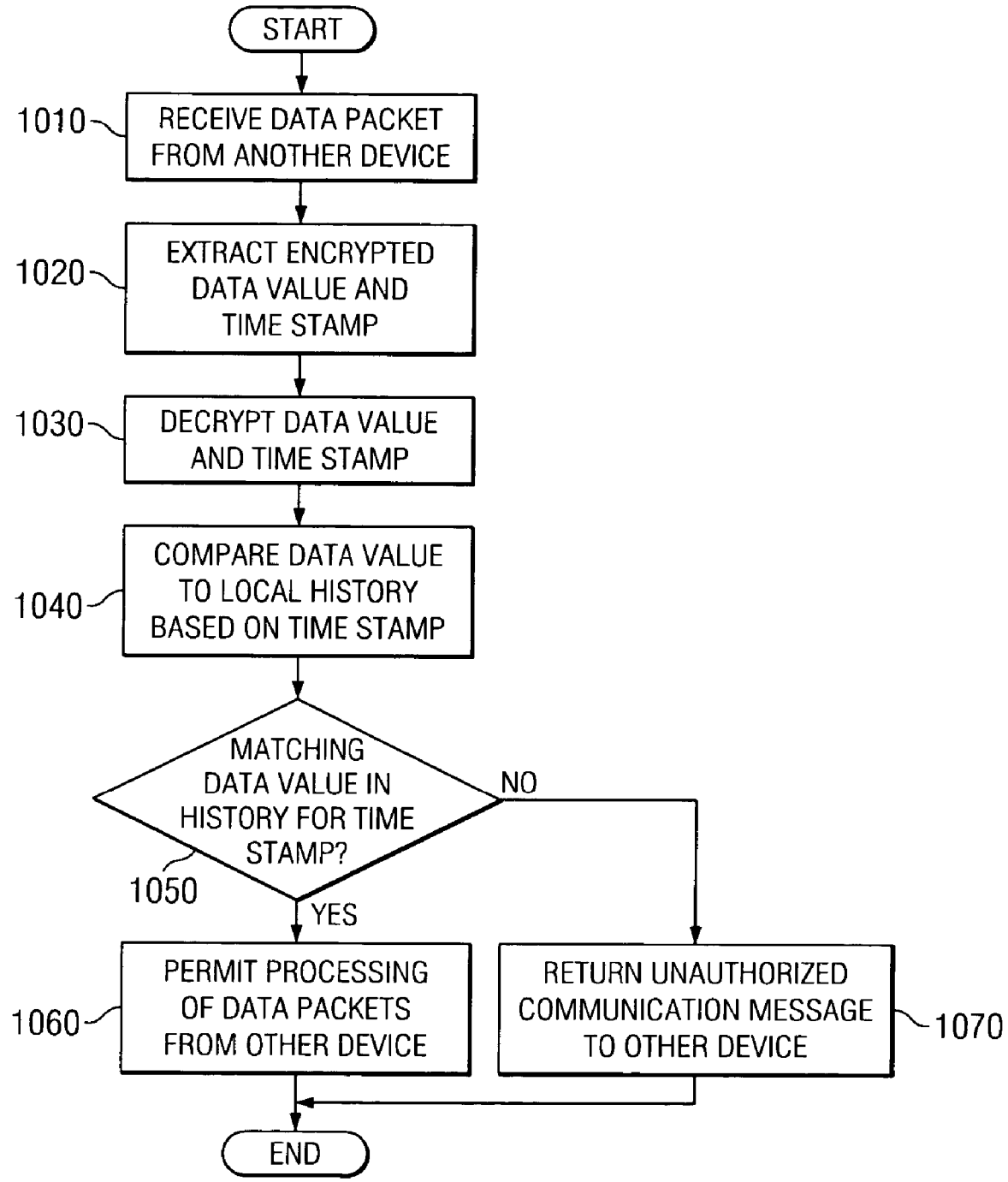
FIG. 10 is a flowchart outlining an exemplary operation of one exemplary embodiment of the present invention with regard to determining whether data packets received from another device are to be processed or not.

FIGS. 8-10 are flowcharts that illustrate various exemplary operations of elements of the present invention. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

FIG. 8 is a flowchart outlining an exemplary operation of one exemplary embodiment of the present invention with regard to injecting a data signal into a received AC power signal. As shown in FIG. 8, the operation starts by receiving security information from a server (step 810) and receiving an external AC electrical signal (step 820). A data signal is generated based on the received security information (step 830). The generated data signal is then added to the AC electrical signal (step 840) and a modified AC electrical signal is output to the site-specific electrical network (step 850).

FIG. 9 is a flowchart outlining an exemplary operation of one exemplary embodiment of the present invention with regard to determining whether a data processing device is to be allowed to operate. As shown in FIG. 9, the operation starts by receiving a power-on or boot-up command (step 910). An AC electrical signal is received from an electrical network (step 920). The AC electrical signal is processed to generate DC current and a "noise" signal that is interpreted to be a data signal (step 930). An authentication operation is performed based on the data signal (step 940). This may include decrypting data stored in the data signal and comparing the decrypted data to stored security information, for example.

A determination is made as to whether the data processing device is authenticated (step 950). If so, the power-up or boot-up procedure is allowed to continue (step 960). Otherwise, if the data processing device is not authenticated, then the boot-up or power-up operation is discontinued (step 970). The operation then terminates.

As previously mentioned, rather than only performing this check at power-up or boot-up, this check may be performed a periodic times. If the check fails, the data processing device may be shutdown.

FIG. 10 is a flowchart outlining an exemplary operation of one exemplary embodiment of the present invention with regard to determining whether data packets received from another device are to be processed or not. As shown in FIG. 10, the operation starts by receiving a data packet from another data processing device (step 1010). The data value for the security information and the time stamp that are encrypted in the data packet are extracted (step 1020) and decrypted (step 1030). A comparison of the data value to a local history based on the time stamp is then performed (step 1040).

A determination is made as to whether there is a matching entry in the local history for the indicated time stamp (step 1050). If there is a match, the processing of the data packet is permitted (step 1060). If there is not a match, an "unauthorized communication" message may be returned to the other data processing device (step 1070) and the data packet is not processed. The operation then terminates.

As mentioned previously, in addition to these functions, a list of authorized data processing devices and unauthorized or "blocked" data processing devices may be maintained and updated based on the security check described in FIG. 10. With such an embodiment, a check of these lists may be performed prior to step 1020 in order to avoid having to perform steps 1020-1050. In such an embodiment, if the address of the sending data processing device is present in the authorized data processing device list, the operation may proceed to step 1060 without performing steps 1020-1050. If the address of the sending data processing device is present in the unauthorized data processing device list, the operation may proceed to step 1070 without performing steps 1020-1050. The lists may be cleared periodically to allow for a recheck of the data packets being sent from the data processing devices that were present in the lists using the steps 1020-1050 discussed above.

While the present invention has been described in terms of the authentication of operations of data processing devices being performed within the data processing devices themselves based on security information received by the data processing device and data received over the electrical network to which the data processing device is coupled, the present invention is not limited to such. Rather, the functions associated with performing authentication may be performed in a server or other computing device associated with the data network. For example, the data of a data signal received by a data processing device may be reported to the server and the server may perform the necessary functions to determine whether the data processing device may power-up or boot-up. The server may then send a signal to the data processing device indicating whether continued boot-up or power-up is permitted.

Similarly, the server may maintain a history of data values received over the electrical network for each data processing device handled by the server. This history may then be used by the server in a similar manner as discussed previously with regard to determining whether a data packet may be processed by a data processing device. If it is determined that the data packet is not to be processed by the data processing device, the server may simply drop the data packet and not forward it to the data processing device. If the data packet is to be processed, then the data packet may be forwarded by the server to the data processing device.

In yet another embodiment, a combination approach may be utilized in which the boot-up or power-up authentication discussed above may be implemented in the data processing devices while the data packet processing authentication may be performed in a separate device, e.g., a server. Thus, the authentication mechanisms of the present invention may be implemented in the data processing devices themselves, in a separate device, such as a server, from the data processing devices, or a combination of both server-based authentication and data processing device authentication mechanisms may be used without departing from the spirit and scope of the present invention.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of authenticating a data processing device, comprising:

receiving an electrical signal having a data signal added therein, wherein the electrical signal is indicative of a location of the data processing device;

extracting the data signal from the electrical signal;

comparing data of the data signal to security information stored in the data processing device; and permitting operation of the data processing device based on the comparison of the data of the data signal to the security information, wherein the method further comprises:

receiving a data packet from a sending device via a data network, wherein the data packet includes a first data value and a first timestamp associated with the first data value;

querying a history data structure for a second data value associated with a second timestamp in the history data structure based on the first timestamp;

comparing the second data value to the first data value;

permitting processing of the data packet if the second data value matches the first data value;

adding an identifier of the sending device to a list based on the comparison of the second data value to the first data value, wherein if the second data value matches the first data value, the list is a list of authorized devices, and wherein if the second data value does not match the first data value, the list is a list of unauthorized devices; and periodically clearing the list of authorized devices and the list of unauthorized devices.

2. A computer program product in a recordable-type computer readable medium for authenticating a data processing device, comprising:

first instructions for receiving an electrical signal having a data signal added therein, wherein the electrical signal is indicative of a location of the data processing device;

second instructions for extracting the data signal from the electrical signal;

third instructions for comparing data of the data signal to security information stored in the data processing device; and fourth instructions for permitting operation of the data processing device based on the comparison of the data of the data signal to the security information, wherein the computer program product further comprises:

fifth instructions for receiving a data packet from a sending device via a data network, wherein the data packet includes a first data value and a first timestamp associated with the first data value;

sixth instructions for querying a history data structure for a second data value associated with a second timestamp in the history data structure based on the first timestamp;

seventh instructions for comparing the second data value to the first data value;

eighth instructions for permitting processing of the data packet if the second data value matches the first data value;

ninth instructions for adding an identifier of the sending device to a list based on the comparison of the second data value to the first data value, wherein if the second data value matches the first data value, the list is a list of authorized devices, and wherein if the second data value does not match the first data value, the list is a list of unauthorized devices; and tenth instructions for periodically clearing the list of authorized devices and the list of unauthorized devices.

3. A method of securing a data network, comprising:

receiving an electrical signal from an external electrical network;

adding a data signal to the electrical signal to generate a modified electrical signal, wherein the data signal includes security data, and wherein the modified electrical signal is indicative of a location of devices coupled to the data network;

outputting the modified electrical signal to a local electrical network; and permitting operation of the devices on the data network based on an authentication of the devices using the data signal extracted from the modified electrical signal, wherein the method further comprises:

receiving a data packet from a second device, via a data network, in a first device, wherein the data packet includes a first data value and a first timestamp associated with the first data value;

querying a history data structure for a second data value associated with a second timestamp in the history data structure based on the first timestamp;

comparing the second data value to the first data value;

permitting processing of the data packet if the second data value matches the first data value;

adding an identifier of the second device to a list based on the comparison of the second data value to the first data value, wherein if the second data value matches the first data value, the list is a list of authorized devices, and wherein if the second data value does not match the first data value, the list is a list of unauthorized devices; and periodically clearing the list of authorized devices and the list of unauthorized devices.

\* \* \* \* \*